United States Patent [19]

Hoen et al.

[11] Patent Number: 4,727,629
[45] Date of Patent: Mar. 1, 1988

[54] FASTENER WHICH ROTATES AND CLAMPS

[75] Inventors: Cuyler Hoen, Rennesselaer; Frederick J. Pufpaff, Loudonville, both of N.Y.

[73] Assignee: Simmons Fastener Corporation, Albany, N.Y.

[21] Appl. No.: 23,162

[22] Filed: Mar. 6, 1987

[51] Int. Cl.⁴ .................. E05C 3/00; A44B 21/00
[52] U.S. Cl. .................................. 24/458; 24/453; 292/194; 292/213
[58] Field of Search ............... 24/458, 459, 453, 270, 24/273, 268, 530, 274 R, 274 P; 292/213, 194, 304, DIG. 21, DIG. 50

[56] References Cited

U.S. PATENT DOCUMENTS

| 400,624 | 4/1889 | Yarger | 292/DIG. 50 |
|---|---|---|---|
| 1,278,645 | 9/1918 | Heilmann | 292/213 |
| 1,437,083 | 11/1922 | Arnold | 292/194 |
| 1,537,870 | 5/1925 | Nester | 292/304 |
| 1,604,330 | 10/1926 | Witkowski | 292/194 |
| 1,623,595 | 4/1927 | Hiering | 292/DIG. 50 |
| 2,018,098 | 10/1935 | Sullivan | 292/194 |
| 2,304,911 | 12/1942 | Harpold | 24/273 |
| 2,852,943 | 12/1974 | Healy | 24/459 |
| 4,393,558 | 7/1983 | Herwegh et al. | 24/459 |
| 4,620,815 | 11/1986 | Goetter | 24/459 |

FOREIGN PATENT DOCUMENTS

| 1156422 | 5/1958 | France | 24/453 |
|---|---|---|---|
| 0853398 | 11/1960 | United Kingdom | 24/453 |

Primary Examiner—Victor N. Sakran
Attorney, Agent, or Firm—Eliot S. Gerber

[57] ABSTRACT

A fastener removably clamps the edges of two panels each having a hole therethrough. The fastener includes a hinge pin, about which the fastener body pivots. To clamp the panels, the hinge pin is extended through the holes in both panels to align the panels and then the fastener body is pivoted so that its top flange portion lies on one panel and its bottom flange portion lies on the other panel, thereby clamping the panels between the two flange portions of the fastener.

13 Claims, 16 Drawing Figures

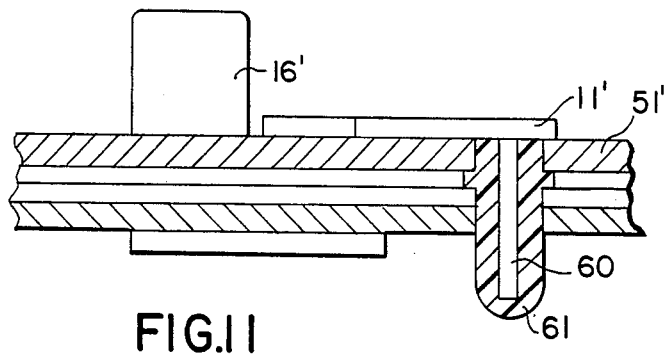
FIG. 11
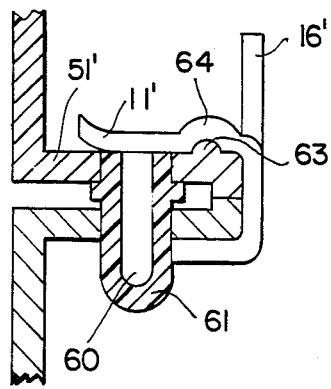
FIG. 12
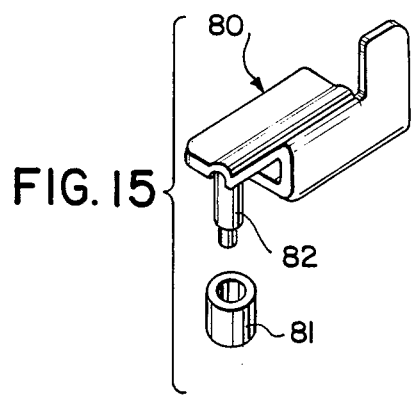
FIG. 15
FIG. 13
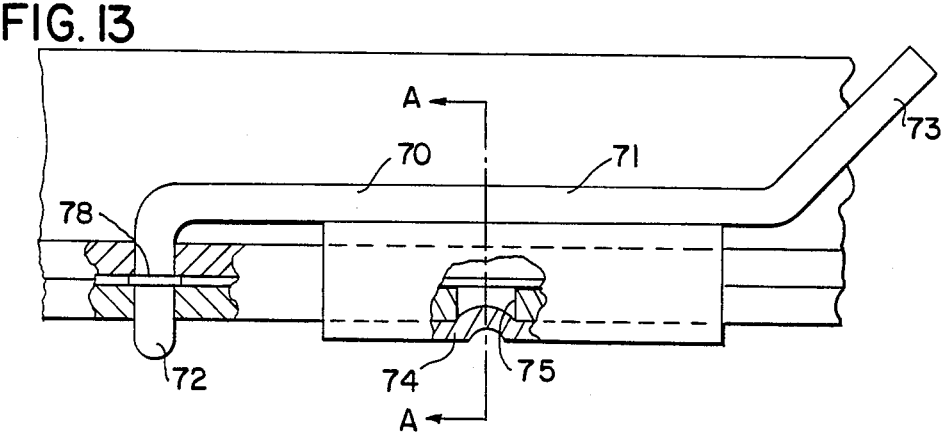
FIG. 13A
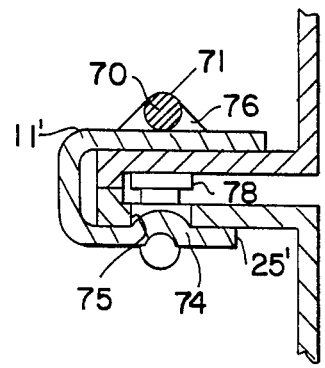
FIG. 14

FASTENER WHICH ROTATES AND CLAMPS

BACKGROUND OF THE INVENTION

The present invention relates to industrial fasteners and more particularly to fasteners which removably join two panels at the edges of the panels.

There are many types of fasteners which are commercially available and are used to join two panels. For example, a hole may be placed within the two panels, the holes aligned, and a bolt passed through the holes and secured to a nut on the other side of the panels. There are also various types of clip members which are used to clip on the edges of panels to retain them in place. Nevertheless, there is a need for a fastener which may be hinged relative to the panels, which may be retained on one of the panels, and which may be slid on a panel and locked in position.

The industrial fastener of the present invention provides particular utility in connection with a tubular conduit which is used to protect cables. The conduit is a relatively stiff plastic which may be opened for the insertion of the cable. The conduit is formed with two outwardly extending flange portions, those flange portions being considered "panels" in this patent. The conduit is placed over the cable by separating the two flange (panel) members and then the flanges are joined and locked together. The fastener is required to be readily removed so that the cables may be serviced.

OBJECTIVES OF THE INVENTION

It is an objective of the present invention to provide an industrial fastener which may be attached to one panel member and may be used to removably secure a second panel member to the first panel member by pivoting the fastener and, in one embodiment, subsequently sliding the fastener relative to its pivot point.

It is a further objective of the present invention to provide such a fastener which may be constructed from relatively low-cost material such as sheet metal and yet is rugged in use and provides a secure fastening device.

It is a further objective of the present invention to provide such a fastener which may not be readily dislodged by accidental touching.

It is a further objective of the present invention to provide such a fastener which comprises a small number of parts so that it may be relatively low in cost and not subject to failure due to the complexity of its construction.

SUMMARY OF THE INVENTION

In accordance with the invention, the first embodiment is a three-part fastener adapted to removably clamp the edges of first and second panels; for example, the panels are the flanges of a plastic conduit. Each panel has a top and a bottom side and a hole therethrough. The holes in the two panels are aligned when the panels are to be joined. The three parts of the fastener are a body member, a hinge pin and a retainer cap.

The body member has a flat top flange portion adapted to slide on the top side of the first panel which has an elongated slot therein. A side wall portion is connected to the top flange portion and is substantially perpendicular thereto. The side wall portion, in height, is substantially the thickness of both panels combined and is adapted to be held against the edges of the panels when the fastener is closed. A flat bottom flange portion is parallel to the top flange portion.

The hinge pin acts as a pivot for the body member and has a head portion, which prevents the hinge pin from escaping through the slot in the top flange portion, and a shank portion which fits through the slot in the top flange portion and the hole in the first panel. The retainer cap fits onto and is joined with the hinge pin and fits in the hole in the second panel.

Preferably, in the first embodiment, the bottom flange portion has a mouth opening which removably traps the retainer cap, the mouth opening being at the end of an elongated slot, which provides spring force.

In the second embodiment, the fastener has a body member similar to the body member of the first embodiment, except that the top flange portion does not have a slot. A hinge pin, having a head portion and a shank portion, is pivotly connected to the body member and to the first panel, after the shank is inserted through the hole in the first panel, by a retainer means, such as a disk member.

The fastener is operated by first aligning the panels through the hole in the second panel. Then the body portion is rotated, on the pivot pin, to clamp the panels between the top and bottom flange portions. The fastener is released by pivoting it in the opposite direction and thereby unclamping the panels.

BRIEF DESCRIPTION OF THE DRAWINGS

Other objectives and features of the present invention will be apparent from the following detailed description, taken in conjunction with the accompanying drawings.

In the drawings:

FIG. 11 is a side cross-sectional view of an alternative fastener of the second embodiment;

FIG. 12 is a front cross-sectional view of the fastener of FIG. 11;

FIG. 13 is a front plan view, partly cut-away to show cross-sections, of another embodiment of the present invention;

FIG. 13A is a top plan view of a washer used in the embodiment of FIG. 13;

FIG. 14 is a side cross-sectional view, taken along A—A of FIG. 13; and

FIG. 15 is an exploded perspective view of an alternative embodiment of the present invention.

DETAILED DESCRIPTION OF THE INVENTION

Figure 1:
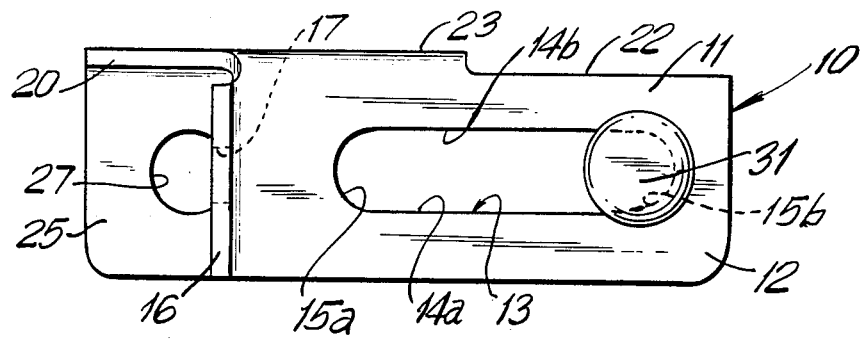
FIG. 1 is a top plan view of the fastener of the present invention.
Figure 2:
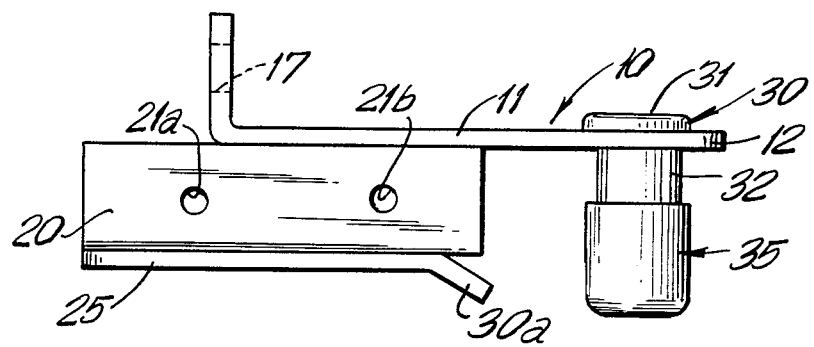
FIG. 2 is a side plan view of the fastener of FIG. 1.
Figure 3:
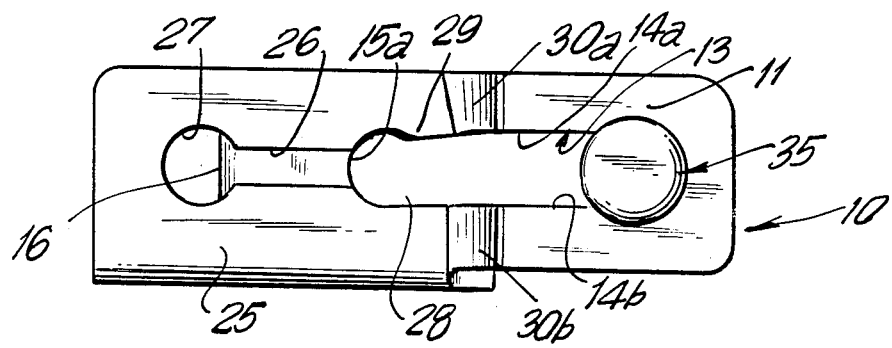
FIG. 3 is a bottom plan view of the fastener of FIG. 1.
Figure 4:
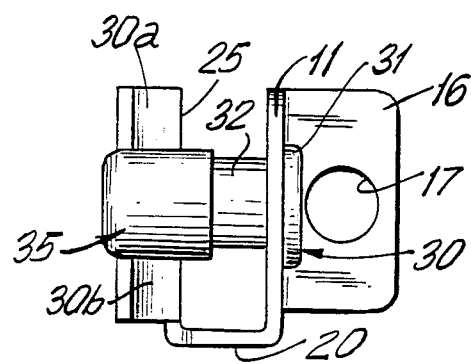
FIG. 4 is a front plan view of the fastener of FIG. 1.

As shown in FIGS. 1-9, the three-piece industrial hinge clip fastener of the present invention has a body member 10 which may be stamped from sheet metal and bent into its final shape, a hinge pin 30 and a plastic retainer cap 35. The body member 10 may be chrome-plated, galvanized or coated with other protective materials.

The body member 10 has a flat top flange portion 11 which is elongated and has a rounded outer corner 12. The flange portion 11 has an elongated slot 13 with parallel side walls 14a, 14b and rounded end walls 15a, 15b. A handle portion 16, having a round hole 17, extends from top flange portion 11 and is preferably perpendicular to the flange portion 11.

The flange portion 11 is connected perpendicular to the side wall portion 20 which has two holes 21a, 21b. The side wall portion 20 is connected to the top flange portion 11 only along a portion of its length so that, preferably, the top flange extends beyond the side wall portion (at 22) for about the same length as it is connected to the side wall portion (at 23), see FIG. 2.

The bottom flange portion 25 is connected to the side wall portion 20, perpendicular thereto and in a parallel plane with respect to the top flange portion 10. The bottom flange portion 25 has an elongated slot 26 having a round hole 27 at its inner end and an enlarged open mouth opening portion 28 at its outer end with an inward protruding lip 29. The outer corners 30a, 30b of the bottom flange portion 25 are bent downward at about a 30° angle. The elongated slot 26 provides a spring effect.

Figure 8:
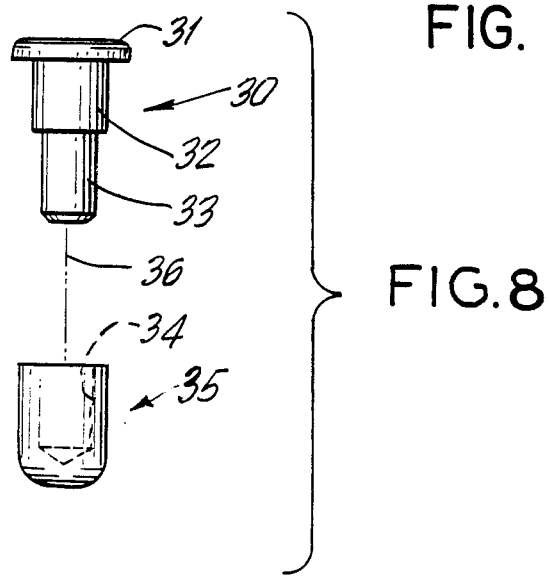
FIG. 8 is an exploded view of the hinge pin and the retainer cap.
Figure 9:
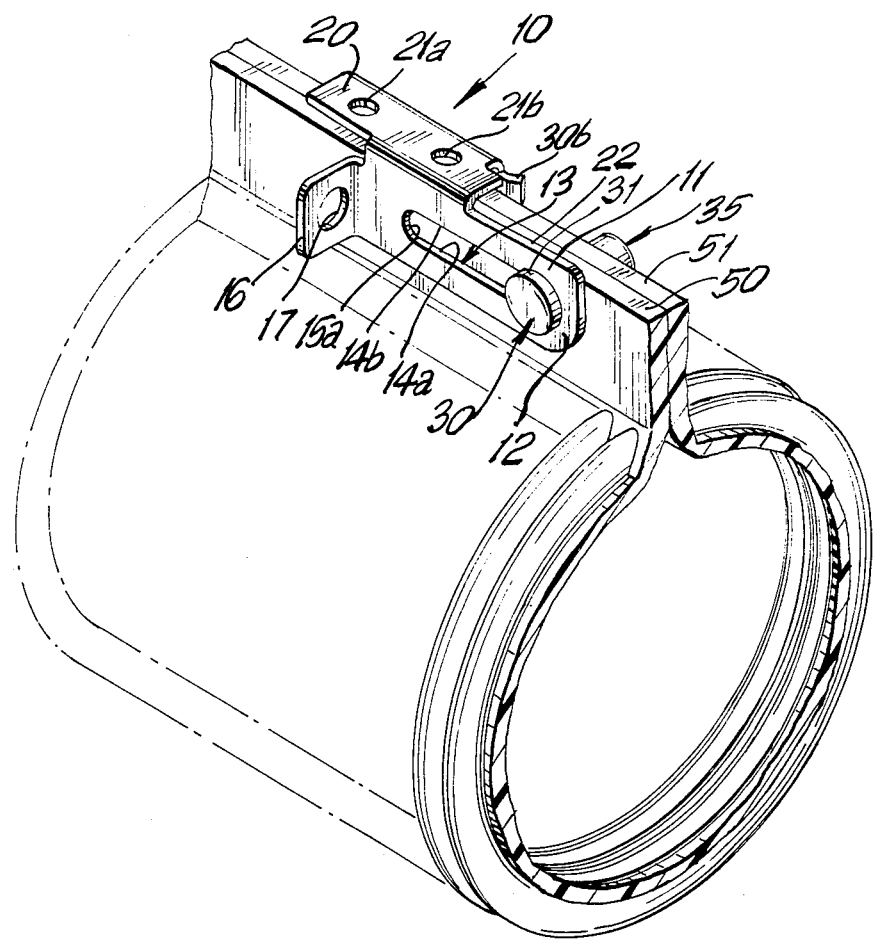
FIG. 9 is a perspective view of the fastener of FIG. 1.

The hinge pin 30 has a head portion 31, an upper shank portion 32 and a bottom shank portion 33, see FIG. 8, each of which is round in cross-section vertical to the imaginary axis 36 of the pin 30. The bottom shank portion 33 fits in, and is retained by, the cavity 34 of the plastic retainer cap 35.

The shank portion 32 slides freely the entire length of the slot 13. The retainer cap 35 is retained in the mouth opening portion 28 and does not slide into the slot 26.

Figure 5:
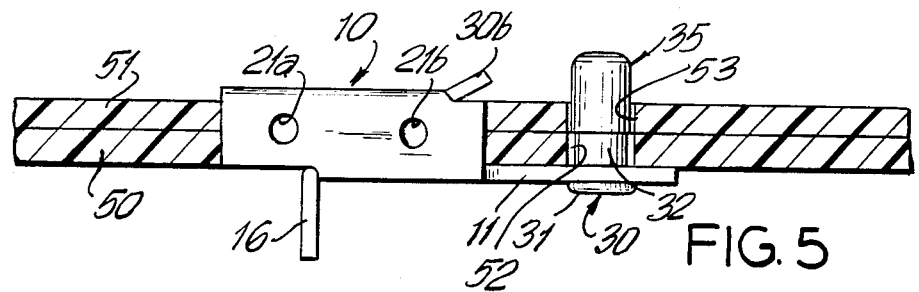
FIG. 5 is a side plan view of the fastener of FIG. 1 installed on an assembly of two panels.

As shown in FIG. 5, the two panels 50,51 to be joined are placed together. The panel 50 has a hole 52 which is slightly larger than the shank portion 32. Similarly, panel 51 has a round hole 53 slightly larger than the outer diameter of the plastic retainer cap 35. The fastener is positioned and retained on panels 50 and 51 by placing the shank portion 32 through the hole 52. Subsequently, the plastic retainer cap 35 is placed over the shank portion 32 by pushing its cavity 34 onto the shank portion 33. The hinge pin and retainer cap act to retain the body member 10 on the panel 50 and act as a pivot for the body member 10. The hole 53 in the lower panel 51 is sufficiently large so that the hole 53 may be placed over the retainer cap 35.

Figure 6:
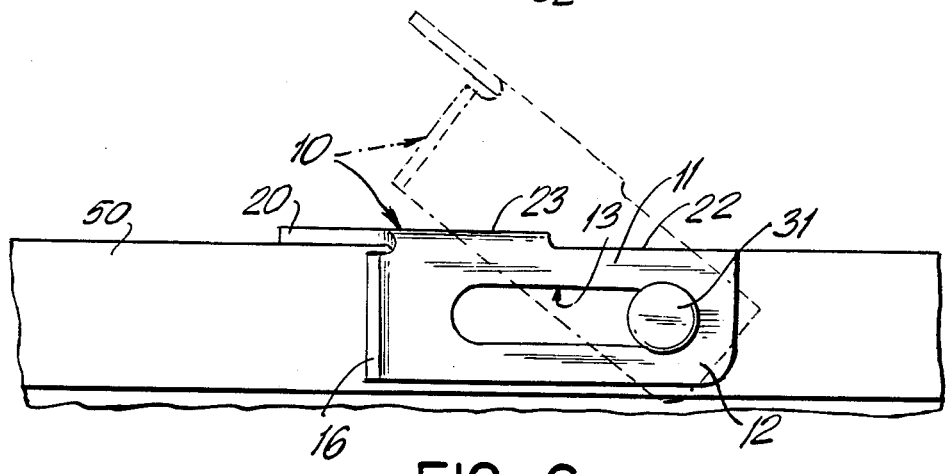
FIG. 6 is a top plan view illustrating the position of the fastener before it is locked.
Figure 7:
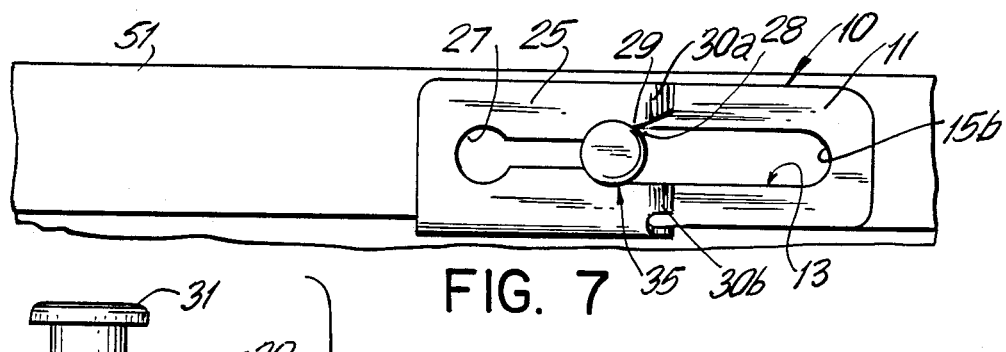
FIG. 7 is a bottom plan view illustrating the fastener in its locked position.

In operation, to place the two panels together, one places the panels 50 and 51 next to each other so that they lie one on top of the other. The hole 53 of the panel 51 is aligned with hole 52 so that the retainer cap 35 is within the hole 53. The body member 10 is free to hinge about the hinge pin 30, as there is sufficient clearance between the head portion 31 and the top of the panel 50. The body member 10 starts at a position so that it is approximately perpendicular to the edges of the panel members 50,51, see dash-dash lines of FIG. 6. The operator then rotates the body member 10 about the hinge pin 30 until the panels 50 and 51 are gripped between its top flange portion 11 and the bottom flange portion 25. The pivoting continues until the side wall portion 20 is flush against the edges of the panels 50,51. The next step is to lock the fastener. This is accomplished by sliding the fastener to the right, as shown in FIGS. 5-7. The operator may push the fastener body member 10 with a finger using the handle portion 16. The body member 10 is guided, during such sliding action, by the elongated slot 13 and the shank portion 32 of the hinge pin 30. The plastic retainer cap 35 enters the mouth opening portion 28. The spring action of the bottom flange portion permits the entry of the retainer cap. The retainer cap is then held within the mouth opening portion 28 by the lip 29. In this position the body member is retained against accidental jarring or dislodging by the retention of the cap within the mouth opening portion. In the case of a cable conduit or other structure which protrudes upwardly from the panel 50, the upward protrusion will prevent accidental rotation of the body member 10 when it is in its locked position.

Figure 10:
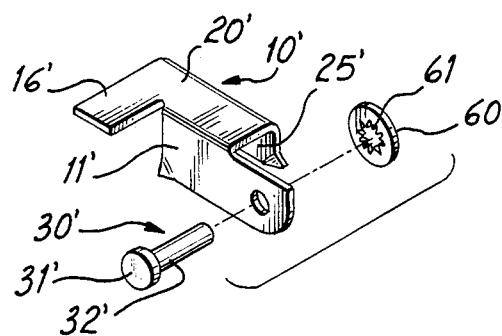
FIG. 10 is a perspective view of the second embodiment of the fastener of the present invention, shown in exploded view before it is placed on a panel.

The second embodiment, shown in FIG. 10, has a sheet metal body portion 10', a hinge pin 30' and a retainer disc 60. The body member 10' has a flat top flange portion 11' having a handle portion 16' which is perpendicular to the flange portion 11'.

The flange portion 11' is connected perpendicularly to the side wall portion 20', which is connected to the top flange portion 11'. The bottom flange portion 25' is connected to the side wall portion 20', perpendicular thereto and in a parallel plane to the top flange portion 10'.

The hinge pin 30' has a head portion 31' and a shank portion 32'. The shank portion 32' fits in, and is retained by, the retainer disc 60, which has inward projecting fingers 61 which grip the shank portion 32'.

As in the first embodiment, the fastener of the second embodiment is positioned and retained on the first panel by placing the shank portion 32' through a hole in the first panel. Then the retainer disc 60 is placed over the shank portion 32' by pushing its flexible fingers 61 onto the shank portion. The hinge pin 30' and retainer disc 60 retain the body member 10' on the first panel and act as a pivot for the body member 10'.

In operation, in the second embodiment, to place the two panels together, one places the two panels so that they lie one on top of the other. Then the holes of the two panels are aligned, using the pin 30', so that the pin 30' is within both holes. The body member 10' is free to hinge about the hinge pin 30'. The body member 10' starts approximately perpendicular to the edges of the panel members. The operator then pushes on the handle portion 16' and turns the body member 10' about the hinge pin 30' until the panels are gripped and clamped between top flange portion 11' and the bottom flange portion 25' and the side wall portion 20' is flush against the edges of the panels.

Other means, such as a plastic cap, may be used in place of the disc 60 to retain the hinge pin 30' in position.

An alternative to the second embodiment is shown in FIG. 11 in which a tang 60 (finger) is struck from the flange portion 11. A plastic cap 61 is pushed over the tang 60 and retained on the tang. The cap has a circular external flange 62 which is larger in diameter than the hole 53' in the outer panel 51'. The cap 61 captivates the fastener in the outer panel 51' and is used as the pivot of the fastener.

In the alternative embodiment shown in FIG. 12, the plastic cap 61 is retained on the tang 60, as in FIG. 11. In addition, an elongated bump (protrusion) 63 formed on the outer panel 51' is removably held in the elongated rib 64 formed on the flange portion 11'. The locking of the bump 63 in the rib 64 holds the fastener in its closed position until the fastener is deliberately unlocked and pivoted to its open position.

In the embodiment shown in FIGS. 13 and 14, the fastener is adapted for heavy-duty use. A unitary rod member 70 consists of a straight central portion 71, a downwardly bent portion 72, which is the pivot member of the fastener, and an upwardly bent portion 73, which is the handle of the fastener. A retaining washer 78, shown in FIG. 13A, fits over the shaft of the bent portion 72 and retains that portion in the hole in the outer panel 51'. As shown in FIG. 14, the rod 70 is connected to the flange portion 11' by welding 76. The fastener is locked, in its closed position, by the dimple 74 (projection) which removably fits into the hole 75 in the lower flange portion 25'.

The fastener 80 shown in FIG. 15 is of plastic resin construction for use in light-duty applications. The fastener 80 is an integral one-piece member which includes an elongated boss 82. The boss 82 is the pivot member of the fastener. The bushing 81 fits on the boss 82 and retains the fastener in connection with the upper panel.

What is claimed is:

1. A fastener adapted to removably clamp the edges of first and second panels, each panel having top and bottom sides and a hole therethrough with the holes in the two panels being aligned when the panels are joined, the fastener comprising three members and including:
   a body member having a flat top flange portion having an elongated slot therein, said top flange portion adapted to slide on the top side of the first panel; a side wall portion connected to said top flange portion and substantially perpendicular thereto, said side wall portion in height being substantially the thickness of both panels combined and adapted to be held against the edges of the panels when the fastener is closed; and a flat bottom flange portion parallel to the top flange portion;
   a hinge pin which acts as a pivot for the body member having a head portion which prevents the hinge pin from escaping through the slot in the top flange portion, a shank portion which fits through the slot in the top flange portion and a hole in the first panel;
   a retainer cap which fits onto and is joined with said hinge pin and which fits in the hole in the second panel.

2. A fastener as in claim 1 wherein said bottom flange portion has a mouth opening to removably trap said retainer cap.

3. A fastener as in claim 2 wherein said mouth opening is at the end of an elongated slot.

4. A fastener as in claim 1 wherein said body member is a unitary one-piece sheet metal member.

5. A fastener adapted to removably clamp the edges of first and second panels, each panel having top and bottom sides and a hole therethrough with the holes in the two panels being aligned when the panels are joined, the fastener comprising three members and including:
   a body member having a flat top flange portion, said top flange portion adapted to lie on the top side of the first panel when the fastener is closed, a side wall portion connected to said top flange portion and substantially perpendicular thereto, said side wall portion in height being substantially the thickness of both panels combined and adapted to be held against the edges of the panels when the fastener is closed; and a flat bottom flange portion parallel to the top flange portion and adapted to lie on the bottom side of the second panel when the fastener is closed;
   a hinge pin which acts as a pivot for the body member having a head portion which prevents the hinge pin from escaping through the top flange portion and a shank portion which fits through the hole in the first panel and the hole in the second panel to align the holes before the fastener is pivoted on the hinge pin to close the fastener and clamp the panels; and
   a retainer means which fits onto and is joined with said hinge pin and which retains the hinge pin on the first panel.

6. A fastener as in claim 5 wherein said body member is a unitary one-piece sheet metal member.

7. A fastener adapted to removably clamp the edges of first and second panels, each panel having top and bottom sides and a hole therethrough with the holes in the two panels being aligned when the panels are joined, the fastener including:
   a body member having a flat top flange portion, said top flange portion adapted to lie on the top side of the first panel when the fastener is closed, a side wall portion connected to said top flange portion and substantially perpendicular thereto said side wall portion in height being substantially the thickness of both panels combined and adapted to be held against the edges of the panels when the fastener is closed; and a flat bottom flange portion parallel to the top flange portion and adapted to lie on the bottom side of the second panel when the fastener is closed;
   a hinge means connected to the body member which acts as a pivot for the body member, the hinge means having a retainer means which prevents the hinge means from escaping from the top flange portion and a shank portion which fits through the hole in the first panel and the hole in the second panel to align the holes before the fastener is pivoted on the shank portion to close the fastener and clamp the panels; and
   a retainer means which fits onto and is joined with said hinge means and which retains the hinge means on the first panel.

8. A fastener as in claim 7 wherein said body member is a unitary one-piece sheet metal member.

9. A fastener as in claim 7 wherein said hinge means is a tang formed from the top flange portion and the retainer means is a cap which fits on said tang.

10. A fastener as in claim 7 wherein said top flange portion and said first panel have an interlocking bump and rib to removably lock the fastener in its clamped position on the first and second panels.

11. A fastener as in claim 7 wherein said body member and hinge means is an integral one-piece plastic member.

12. A fastener as in claim 7 wherein said hinge means is a rod welded to said top flange portion.

13. A fastener adapted to removably clamp the edges of first and second panels, each panel having top and bottom sides and a hole therethrough with the holes in the two panels being aligned when the panels are joined, the fastener comprising three members and including:

a body member having a flat top flange portion, said top flange portion adapted to lie on the top side of the first panel when the fastener is closed, a side wall portion connected to said top flange portion and substanitally perpendicular thereto, said side wall portion in height being substantially the thickness of both panels combined and adapted to be held agiant the edges of the panels when the fastener is closed; and a flat bottom flange portion parallel to the top flange portion and adapted to lie on the bottom side of the second panel when the fastener is closed;

a hinge pin which acts as a pivot for the body member having a head portion which prevents the hinge pin from escaping through the top flange portion and a shank portion which fits through the hole in the first panel and the hole in the second panel to align the holes before the fastener is pivoted on the hinge pin to close the fastener and clamp the panels and which protrudes beyond the second panel;

a retainer means which fits onto and is joined with said hinge pin and which retains the hinge pin on the first panel; wherein said top flange portion carries said hinge pin on a portion which extends beyond said bottom flange portion so that said bottom flange portion does not interfere with said protruding hinge pin when the fastener is closed.

* * * * *